United States Patent
Fanning

(10) Patent No.: US 7,213,107 B2
(45) Date of Patent: May 1, 2007

(54) DEDICATED CACHE MEMORY

(75) Inventor: Blaise B. Fanning, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 318 days.

(21) Appl. No.: 10/750,148

(22) Filed: Dec. 31, 2003

(65) Prior Publication Data

US 2005/0144393 A1  Jun. 30, 2005

(51) Int. Cl.
*G06F 12/06* (2006.01)

(52) U.S. Cl. .................. 711/121; 711/122; 711/129; 711/120; 711/170

(58) Field of Classification Search ............... 711/118, 711/135, 170, 121, 122, 129, 120
See application file for complete search history.

(56) References Cited

U.S. PATENT DOCUMENTS

| | | |
|---|---|---|
| 4,371,929 A | 2/1983 | Brann et al. |
| 4,905,141 A | 2/1990 | Brenza |
| 5,293,609 A | 3/1994 | Shih et al. |
| 5,325,504 A | 6/1994 | Tipley et al. |
| 5,369,753 A | 11/1994 | Tipley |
| 5,426,765 A | 6/1995 | Stevens et al. |
| 5,692,154 A | 11/1997 | Tucker et al. |
| 5,829,027 A | 10/1998 | Goodrum |
| 6,161,166 A | 12/2000 | Doing et al. |
| 6,272,598 B1 | 8/2001 | Arlitt et al. |
| 6,360,303 B1 | 3/2002 | Wisler et al. |
| 6,427,195 B1 | 7/2002 | McGowen et al. |
| 6,457,102 B1 | 9/2002 | Lambright et al. |
| 6,493,800 B1 | 12/2002 | Blumrich |
| 6,516,387 B1 | 2/2003 | Auracher |
| 6,523,092 B1 | 2/2003 | Fanning |
| 6,625,695 B2 | 9/2003 | Fanning |
| 6,662,272 B2 | 12/2003 | Olarig et al. |
| 6,865,647 B2 | 3/2005 | Olarig et al. |
| 6,904,499 B2 | 6/2005 | Fanning |
| 7,017,008 B2 | 3/2006 | Fanning |
| 2003/0065886 A1 * | 4/2003 | Olarig et al. ............... 711/129 |
| 2003/0225975 A1 | 12/2003 | Hokenek et al. |

OTHER PUBLICATIONS

Jin et al—Sep. 5, 1997—An Efficient Solution ot the Cache Thrashing Problem Caused by True Data Sharing.
PCT Search Report dated May 10, 2005.
Kim et al - IEEE Transactions on VLSI, vol. 9, No. 4, pp. 509-523 - Aug. 2001 - A reconfigurable multi-function computing cache architecture.
Zhang et al - ACM Transactions on Embedded Computing Systems, vol. 4, No. 2, May 2005, pp. 363-387 - A highly configurable cache for low energy embedded systems.

* cited by examiner

*Primary Examiner*—Pierre-Michel Bataille
(74) *Attorney, Agent, or Firm*—Blakely, Sokoloff, Taylor & Zafman LLP

(57) ABSTRACT

A method and apparatus for a dedicated cache memory are described. Under an embodiment of the invention, a cache memory includes a general-purpose sector and a dedicated sector. The general-purpose sector is to be used for general computer operations. The dedicated sector is to be dedicated to use for a first computer process.

21 Claims, 5 Drawing Sheets

DEDICATED CACHE MEMORY

FIELD

An embodiment of the invention relates to computer storage in general, and more specifically to a dedicated cache memory.

BACKGROUND

In computer operation, cache memories can improve system operation by providing access to certain data in memory that can be accessed more quickly than the mass storage. A processor and system may utilize multiple cache memories of differing sizes, locations, technologies, and operational speeds.

However, the use of cache memories may be more complicated when certain operations, such as when processes operate in allocated cycles. For example, a computer that receives a data stream, such as a multimedia stream, may pre-allocate certain compute cycles to the processing of the data stream to enable predictable and reliable operations.

If data processing for a particular operation is handled in certain allocated cycles, it is possible that a cache memory will be flushed in the intervals in between the allocated cycles. As a result, the data stream may not be able to utilize the cache to enable efficient operations because accesses to the cache will likely not result in usable cached data.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
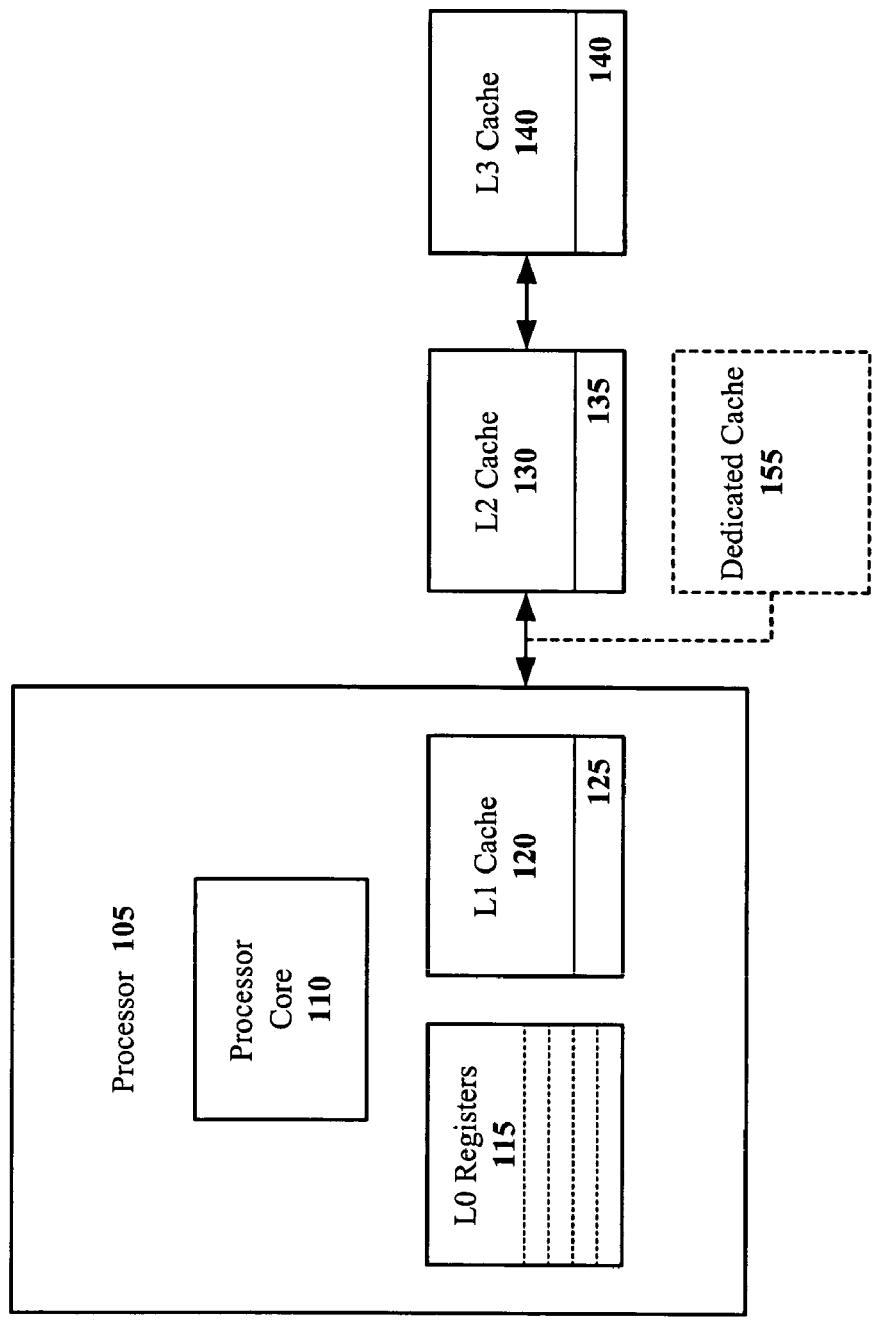
FIG. 1 illustrates an embodiment of a microprocessor utilizing a dedicated cache memory.

A method and apparatus are described for a dedicated cache memory.

Before describing an exemplary environment in which various embodiments of the present invention may be implemented, some terms that will be used throughout this application will briefly be defined:

As used herein, "cache" or "cache memory" means a memory in which data is stored for fast retrieval. For example, a cache memory may comprise a small, fast memory to hold recently accessed data and to enable quicker subsequent access to the data. In one example, data that is read from or written to a main memory may be copied to a cache memory. In another example, data may be prefetched to store to a cache memory to enable more efficient operations.

As used herein, "thread" or "computing thread" means a part, path, task, or route of execution within a program, routine, or other process. A thread may be executed independently of other threads.

According to an embodiment of the invention, cache memory for a computer includes a dedicated cache memory. The dedicated cache memory is dedicated to one or more computer operations. Under one embodiment, the dedicated cache memory is a thread-specific memory that dedicates one or memories or sectors of memories for a certain thread or threads.

According to one embodiment of the invention, a dedicated cache is part of a cache memory, the cache memory comprising a general-purpose portion or sector and a dedicated portion or section. According to another embodiment of the invention, a dedicated cache comprises a memory that is separate from a general-purpose cache memory.

Under an embodiment of the invention, the allocation of memory for a dedicated cache may be dynamic and may be created, modified, or eliminated as necessary. For example, a computer system encountering a process that would benefit from a dedicated cache may establish the dedicated cache.

An embodiment of the invention can be used for any computer process. An embodiment may be particularly useful for processes or threads that are active during certain allocated cycles or time slices. In such processes, data in a general-purpose cache may be flushed between allocated cycles. An embodiment of a dedicated cache may provide for a cache memory that is insulated from the operations of a general-purpose cache and thus may retain data for access by a particular thread or process without regard to operations in the general-purpose cache.

Under a particular embodiment of the invention, a dedicated cache memory is utilized for multi-media data. Multimedia operations may be extremely time sensitive and cache performance can greatly affect operational performance. An embodiment of the invention may be utilized to provide a thread-specific cache memory for a processor to enable predictable performance for multimedia encoding and decoding operations. For example, general-purpose PCs (personal computers) may be used to play DVD (digital versatile disk, previously referred to as digital video disk) or other media streams to a television out device. In future applications, computing platforms may be used to broadcast multiple streams of audio and video data over wired and wireless networks throughout a home or other location. For successful operation, a general-purpose computing platform may be required to deliver accurate (or glitchless) media streams, even in the presence of other computing workloads such as word processors, spreadsheets, and Internet browsers. Under an embodiment of the invention, to enable processes to operate in a predictable and reliable manner, multimedia encoders and decoders that are provided access to pre-allocated compute cycles to allow timely processing of data streams are allocated thread-specific cache memory.

The time required to execute a predefined operation that requires a predefined number of calculations may vary substantially according to applicability of cached data to the relevant workload. Under an embodiment of the invention, a certain portion of cache memory is allocated the exclusive use of a particular thread or threads. In this manner, the data access time for a known workload may remain relatively constant and the amount of time required to process a worst-case data stream may be predicted.

In one example, computationally intensive workloads in current systems may require in excess of 1 gigabyte (GB) per second of main memory bandwidth. If it is assumed that a typical processor cache contains, for example, 1 megabyte (MB) of memory, then a simple division of these factors indicates that the entire cache may be flushed every millisecond. A multimedia thread that uses 10% of a system's computing power might be scheduled to compute for a 1-millisecond time slice every 10 milliseconds. In approximate terms, a cache memory may potentially be completely flushed nine times between activations of the multimedia thread.

Under an embodiment of the invention, a dedicated cache memory may be used by any operations that share the targeted thread ID. In the example of a thread that is scheduled to compute for a 1 millisecond time slice every 10 milliseconds, the processor, although it executes general-purpose code for 9 milliseconds between media thread activations, does not disturb the section or sections of the cache memory dedicated for specific media operations. As a result, the media instruction streams are not required to waste allocated computes by reinitializing cache data.

FIG. 1 illustrates an embodiment of a microprocessor utilizing a dedicated cache memory. In this illustration, a processor 105 includes a processor core 110 for processing of operations and one or more cache memories. The cache memories may be structured in various different ways. Using common terminology for cache memories, the illustration shown in FIG. 1 includes an L0 memory 115 that comprises a plurality of registers. Included on the processor 105 is an L1 cache 120 to provide very fast data access. Separate from the processor 105 is an L2 cache 130, which generally will be larger but not as fast as the L1 cache 120. A system may include other cache memories, such as the L3 cache 140 that is illustrated communicating with the processor through the L2 cache 130.

In the illustration shown in FIG. 1, one or more of the cache memories includes a portion or section that acts as a dedicated cache memory. For example, L1 cache 120 includes dedicated cache 125, L2 cache 130 includes dedicated cache 135, and L3 cache 140 includes dedicated cache 145. Under another embodiment of the invention, the dedicated cache may be separate from the general-purpose cache memory. In one possible example, dedicated cache 155 may act in parallel with the L2 cache 130. The dedicated cache memories are dedicated to certain processes, such as to data for certain threads.

Figure 2:
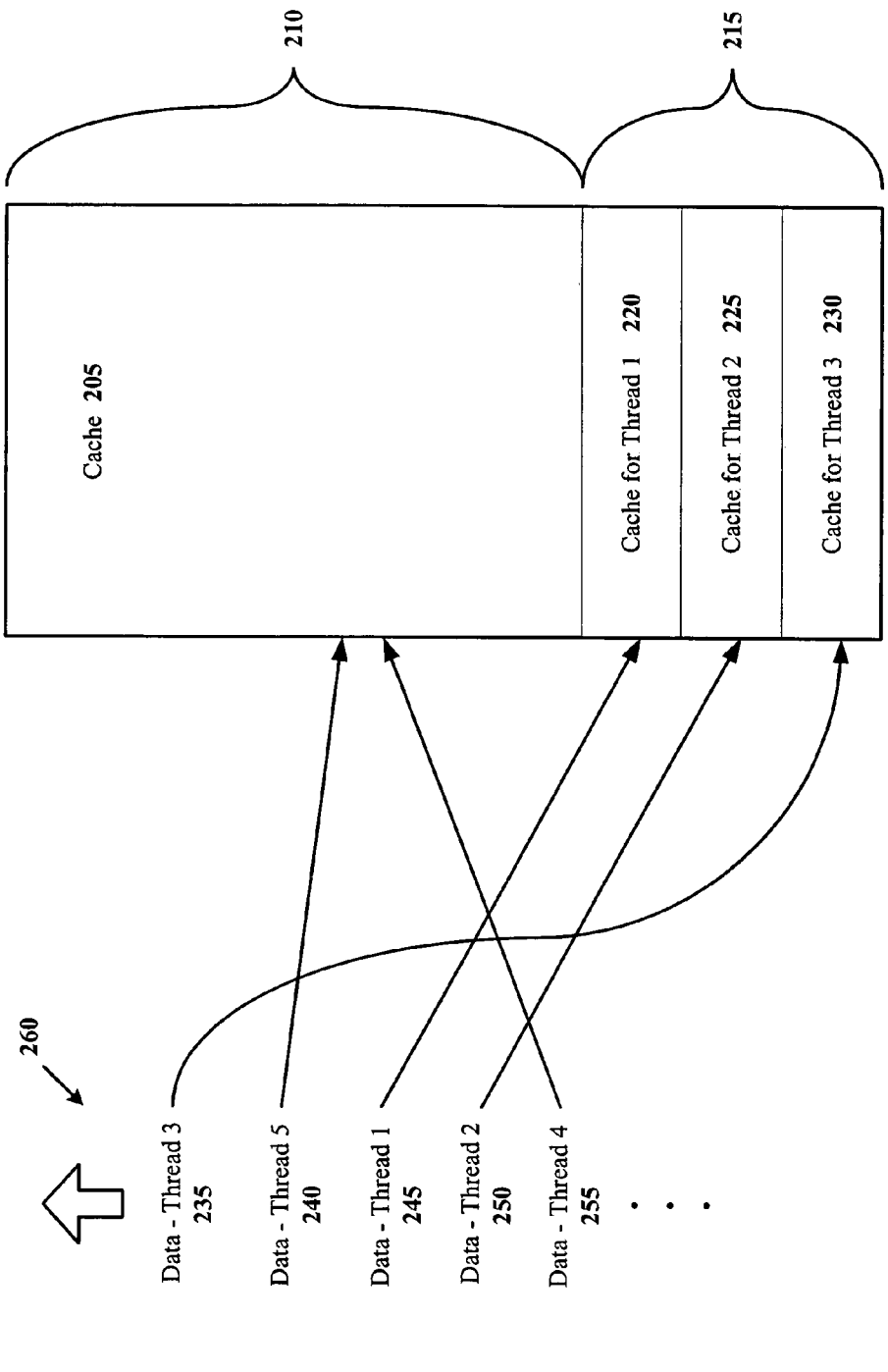
FIG. 2 illustrates an embodiment of a cache memory operation.

FIG. 2 illustrates an embodiment of a cache memory operation. In this illustration, a cache memory 205 includes a general-purpose portion 210, to be utilized by multiple operations, and a dedicated portion 215. The dedicated portion 215 includes one or more sub-portions, with each sub-portion being a dedicated cache memory for a particular thread. In this illustration, the dedicated portion 215 includes a cache for a first thread designated as Thread 1 220, a cache for a second thread designated as Thread 2 225, and a cache for a third thread designated as Thread 3 230. Any data to be cached that relates to the operation of the relevant threads will be cached in the appropriate dedicated cache memory in the dedicated portion 215. Any other data to be cached will be cached in the general-purpose portion 210.

In one example, five different data elements are to be cached. For the purposes of this illustration, it is assumed that there are five possible threads, these threads being Thread 1 through Thread 5. A data stream 260 comprises data to be cached, with the data elements relating to various different threads. In this illustration, data for Thread 3 235 is cached in the Thread 3 dedicated cache 230. Data for Thread 5 240 is not related to a dedicated cache and is therefore cached in the general-purpose portion 210 of cache memory 205. Data for Thread 1 245 is cached in the Thread 1 dedicated cache 220. Data for Thread 2 250 is cached in the Thread 2 dedicated cache 225. Data for Thread 4 255 is not related to a dedicated cache and is therefore cached in the general-purpose portion 210 of cache memory 205.

Figure 3:
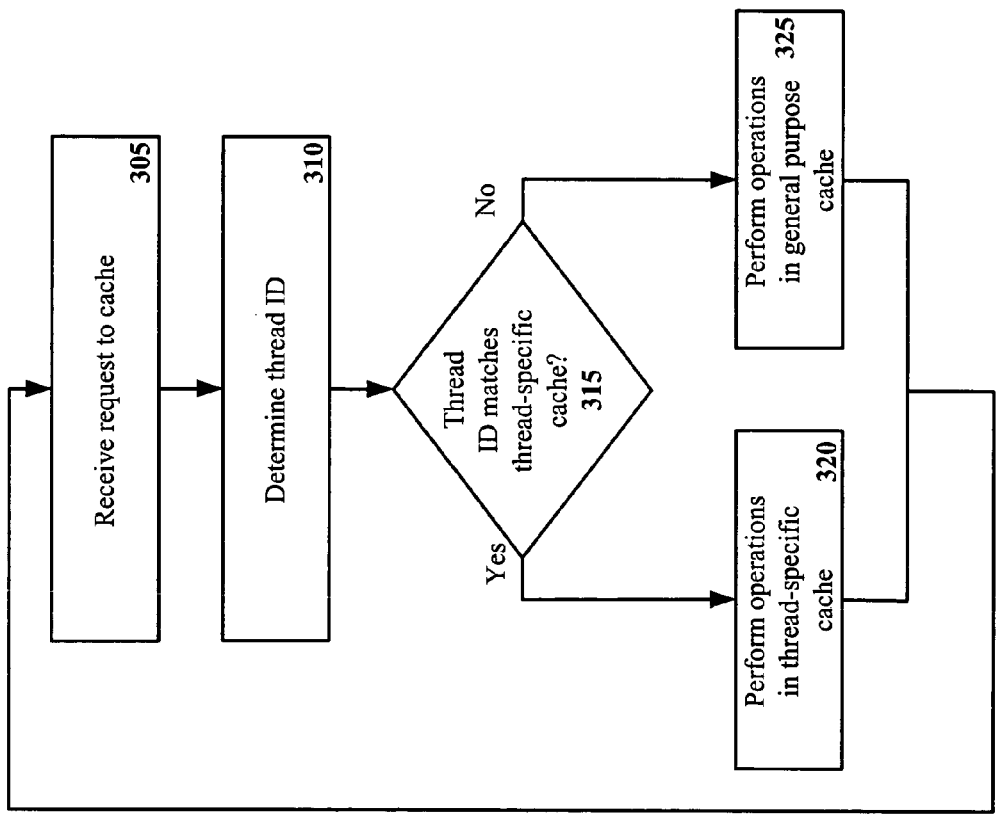
FIG. 3 is a flow chart illustrating an embodiment of dedicated cache memory processes.

FIG. 3 is a flow chart illustrating an embodiment of operation of a dedicated cache memory. For FIG. 3, it is assumed that a system comprises a general-purpose cache and at least one dedicated cache. In this illustration, the dedicated cache is dedicated to a specific thread. In FIG. 3, a request to cache certain data is received 305. For example, recently accessed data may be submitted to a cache. There is a determination regarding the thread ID for the data 310. There is then a determination whether thread ID matches a thread-specific cache 315. If so, operations are performed in the thread-specific cache 320. If not, operations are performed in the general-purpose cache 325.

Figure 4:
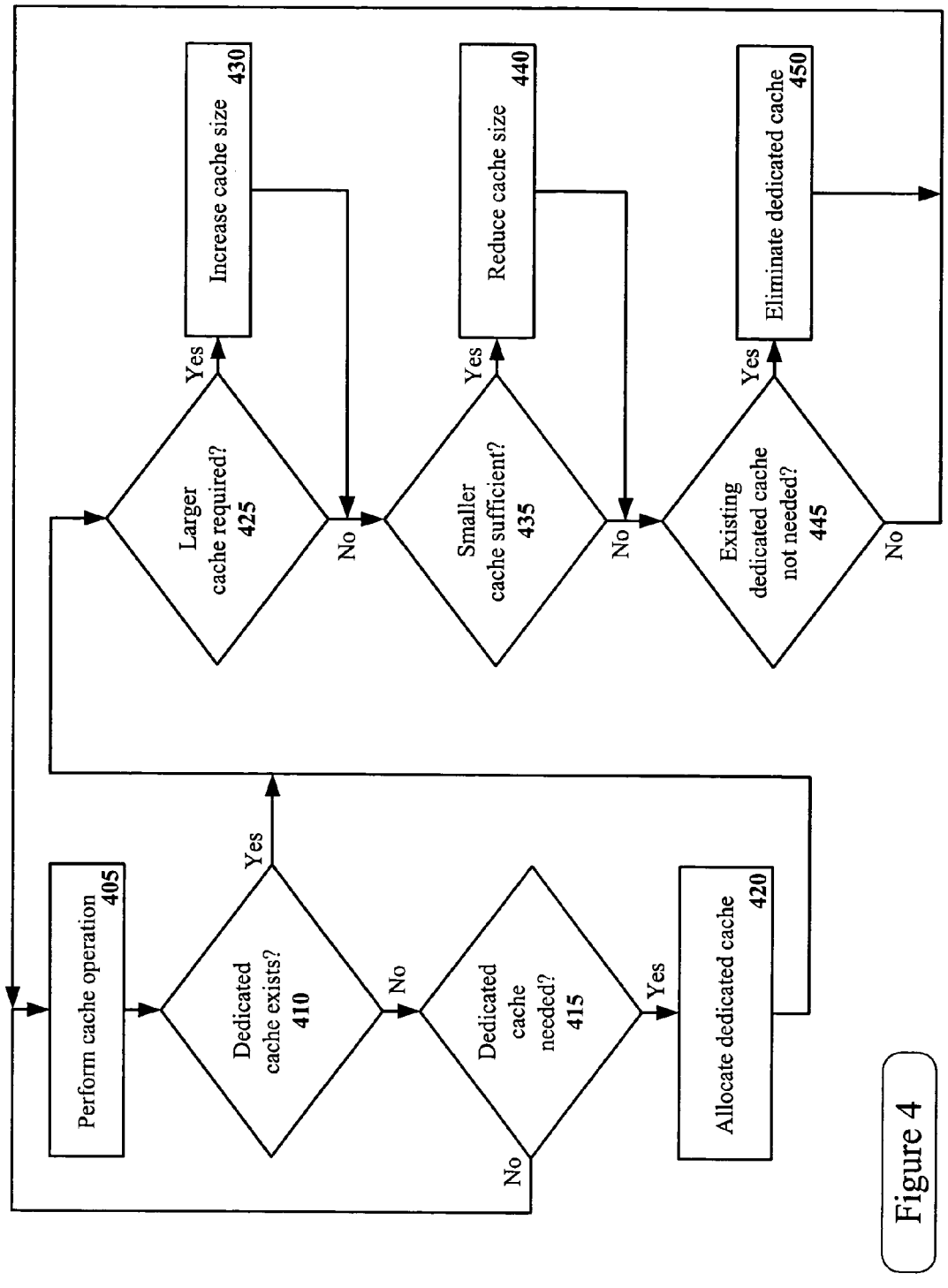
FIG. 4 is an illustration of an embodiment of dynamic establishment and modification of a dedicated cache memory.

FIG. 4 is an illustration of an embodiment of dynamic establishment and modification of a dedicated cache memory. FIG. 4 illustrates certain operations that may be included in dynamic operations. In this illustration, a cache operation is performed 405. There is a determination whether a dedicated cache for the appropriate thread exists 410. If not, there is a determination whether a dedicated cache is needed 415. If there is a need for a dedicated cache, a dedicated cache for the appropriated thread is allocated 420.

If a thread-specific cache existed or has been created, there are then determinations regarding the size and continued existence of the cache. If a larger cache is needed 425, the cache size may be increased 440. If a smaller cache would be sufficient 435, the cache size may be reduced 440. If an existing dedicated cache for a particular thread is no longer required 445, such as when the thread is no longer active, the dedicated cache may be eliminated 450.

Figure 5:
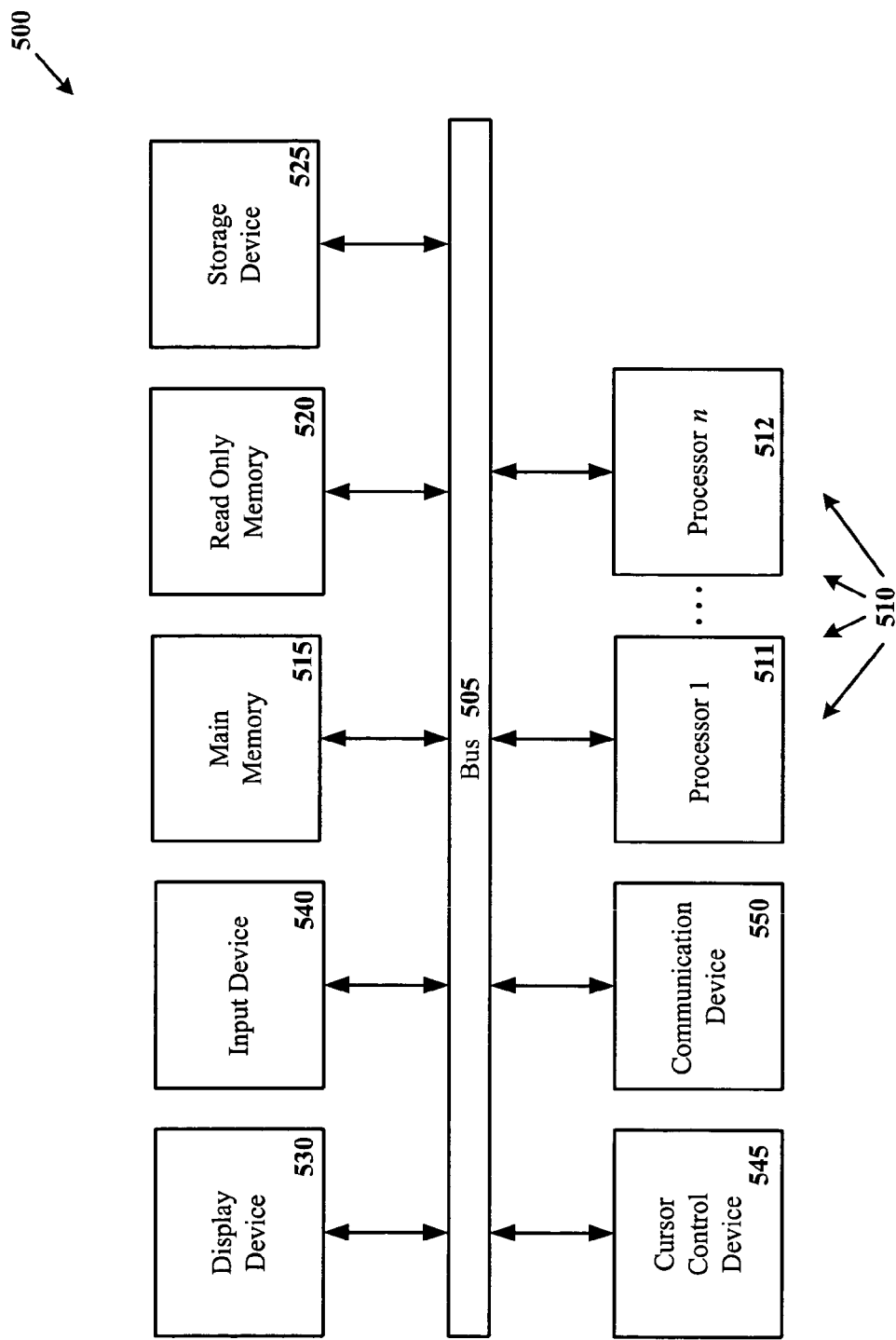
FIG. 5 illustrates an embodiment of a computer environment.

FIG. 5 illustrates an embodiment of an exemplary computer environment. Under an embodiment of the invention, a computer 500 comprises a bus 505 or other communication means for communicating information, and a processing means such as one or more processors 510 (shown as 511 through 512) coupled with the first bus 505 for processing information.

The computer 500 further comprises a random access memory (RAM) or other dynamic storage device as a main memory 515 for storing information and instructions to be executed by the processors 510. Main memory 515 also may be used for storing temporary variables or other intermediate information during execution of instructions by the processors 510. The computer 500 also may comprise a read only memory (ROM) 520 and/or other static storage device for storing static information and instructions for the processor 510.

A data storage device 525 may also be coupled to the bus 505 of the computer 500 for storing information and instructions. The data storage device 525 may include a magnetic disk or optical disc and its corresponding drive, flash memory or other nonvolatile memory, or other memory device. Such elements may be combined together or may be separate components, and utilize parts of other elements of the computer 500.

The computer 500 may also be coupled via the bus 505 to a display device 530, such as a liquid crystal display (LCD) or other display technology, for displaying information to an end user. In some environments, the display device may be a touch-screen that is also utilized as at least a part of an input device. In some environments, display device 530 may be or may include an auditory device, such as a speaker for providing auditory information. An input device 540 may be coupled to the bus 505 for communicating information and/or command selections to the processor 510. In various implementations, input device 540 may be a keyboard, a keypad, a touch-screen and stylus, a voice-activated system, or other input device, or combinations of such devices. Another type of user input device that may be included is a cursor control device 545, such as a mouse, a trackball, or cursor direction keys for communicating direction information and command selections to processor 510 and for controlling cursor movement on display device 530.

A communication device 550 may also be coupled to the bus 505. Depending upon the particular implementation, the communication device 550 may include a transceiver, a wireless modem, a network interface card, or other interface device. The computer 500 may be linked to a network or to other devices using the communication device 550, which may include links to the Internet, a local area network, or another environment. In an embodiment of the invention, the communication device 550 may provide a link to a service provider over a network.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically erasable programmable read-only memory), magnetic or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A processor comprising:
   a processor core; and
   a cache memory for general-purpose operation of the processor core;
   wherein the processor is to evaluate the cache memory when a first computer process associated with a thread results in a cache operation for the cache memory to determine whether a dedicated cache for the thread exists in the cache memory and, if a dedicated cache does not exist, whether a dedicated cache for the thread is needed; and
   wherein if the processor determines that a dedicated cache for the thread does not exist and a dedicated cache is needed for the thread, the processor is to create a dedicated sector in the cache memory, the resulting cache memory having a first sector for the general purpose operation and a second sector dedicated to the thread.

2. The processor of claim 1, wherein first computer process is a multi-media process.

3. The processor of claim 1, wherein the first computer process is allocated a subset of the computing cycles of the processor.

4. The processor of claim 1, wherein if the dedicated cache exists for the thread of the computer operation, the processor makes a determination whether the dedicated cache should be eliminated.

5. The processor of claim 1, wherein the processor is to make a determination whether the dedicated cache should be dynamically modified.

6. A system comprising:
   a bus;
   a processor coupled to the bus; and
   a cache memory to support operations for the processor;
   wherein the processor is to evaluate the cache memory when a first computer process associated with a first program thread results in a cache operation for the cache memory to determine whether a dedicated cache for the first program thread exists in the cache memory and, if a dedicated cache does not exist, whether a dedicated cache for the first program thread is needed; and
   wherein if the processor determines that a dedicated cache for the first program thread does not exist and a dedicated cache is needed for the first program thread, the processor is to create a dedicated sector in the cache memory, the resulting cache memory having a first cache sector for the general purpose operation and a second cache sector dedicated to the first program thread.

7. The system of claim 6, wherein first program thread is a multi-media process.

8. The system of claim 6, wherein the first program thread is allocated a subset of the computing cycles of the processor.

9. The system of claim 6, wherein the processor is to dynamically eliminate the second cache memory sector.

10. The system of claim 6, wherein processor is to dynamically change the size of the second cache sector.

11. The system of claim 6, wherein the first cache sector and the second cache sector are included in the processor.

12. A method comprising:
performing a computer operation associated with a first thread, the computer operation resulting in an operation for a cache memory;
determining whether a dedicated cache exists for the first thread;
upon a determination that a dedicated thread exists for the first thread, performing the cache operation in the dedicated cache; and
upon a determination that a dedicated cache does not exist for the first thread, determining whether a dedicated cache is needed for the first thread.

13. The method of claim 12, further comprising creating the dedicated cache memory in the cache memory.

14. The method of claim 12, further comprising determining that the dedicated cache memory is an incorrect size and changing the size of the dedicated cache memory.

15. The method of claim 12, further comprising determining that the dedicated cache memory is not needed and eliminating the dedicated cache memory.

16. The method of claim 12, further comprising flushing the cache memory without flushing the dedicated cache memory.

17. A machine-readable medium having stored thereon data representing sequences of instructions that, when executed by a processor, cause the processor to perform operations comprising:

performing a computer operation associated with a first thread, the computer operation resulting in an operation for a cache memory;
determining whether a dedicated cache exists for the first thread;
upon a determination that a dedicated thread exists for the first thread, performing the cache operation in the dedicated cache; and
upon a determination that a dedicated cache does not exist for the first thread, determining whether a dedicated cache is needed for the first thread.

18. The medium of claim 17, wherein the sequence of instructions further comprise instructions causing the processor to perform operations comprising creating the dedicated cache in the cache memory.

19. The medium of claim 17, wherein the sequence of instructions further comprise instructions causing the processor to perform operations comprising determining that the dedicated cache is an incorrect size and changing the size of the dedicated cache.

20. The medium of claim 17, wherein the sequence of instructions further comprise instructions causing the processor to perform operations comprising determining that the dedicated cache memory is not needed and eliminating the dedicated cache.

21. The medium of claim 17, wherein the sequence of instructions further comprise instructions causing the processor to perform operations comprising flushing the cache memory without flushing the dedicated cache.

* * * * *